(12) United States Patent
Klemm

(10) Patent No.: US 10,386,251 B2
(45) Date of Patent: Aug. 20, 2019

(54) DEVICE FOR ELECTRICALLY MEASURING A FORCE

(71) Applicant: Jan Klemm, Geisa-Borsch (DE)

(72) Inventor: Jan Klemm, Geisa-Borsch (DE)

( * ) Notice: Subject to any disclaimer, the term of this patent is extended or adjusted under 35 U.S.C. 154(b) by 0 days.

(21) Appl. No.: 15/745,196

(22) PCT Filed: Jul. 9, 2016

(86) PCT No.: PCT/DE2016/100305
§ 371 (c)(1),
(2) Date: Jan. 16, 2018

(87) PCT Pub. No.: WO2017/008784
PCT Pub. Date: Jan. 19, 2017

(65) Prior Publication Data
US 2019/0011316 A1    Jan. 10, 2019

(30) Foreign Application Priority Data

Jul. 14, 2015 (DE) .................. 10 2015 111 425

(51) Int. Cl.
*G01L 1/22* (2006.01)
*G01L 1/18* (2006.01)

(52) U.S. Cl.
CPC .............. *G01L 1/2262* (2013.01); *G01L 1/18* (2013.01)

(58) Field of Classification Search
CPC ......... G01L 1/2262; G01L 2/18; G01L 3/108; G01L 25/003
USPC .................................................... 73/862.628
See application file for complete search history.

(56) References Cited

U.S. PATENT DOCUMENTS

| 5,345,824 | A  | * | 9/1994 | Sherman | ............ B81C 99/004 73/514.18 |
| 7,196,599 | B2 | * | 3/2007 | Dabbaj | ............ H02N 1/006 200/181 |
| 8,957,566 | B2 | * | 2/2015 | Tabata | ............ H01L 41/1136 310/318 |
| 9,021,898 | B2 | * | 5/2015 | Fuchs | ............ G01L 1/005 73/862.381 |

(Continued)

FOREIGN PATENT DOCUMENTS

| DE | 102 53 178 A1 | 3/2004 |
| DE | 10 2010 024808 A1 | 12/2011 |

*Primary Examiner* — Jonathan Dunlap
*Assistant Examiner* — Octavia Hollington
(74) *Attorney, Agent, or Firm* — Karin L. Williams; Mayer & Williams PC

(57) ABSTRACT

A device for electrically measuring a force includes a load cell having a first metal electrode and a second metal electrode disposed opposite thereof in the direction of the force, each having contact surfaces in which the force to be measured can be impressed, and electrical resistance in the range of a few milliohms to less than or equal to ten ohms and a mean roughness value ($R_a$) of less than or equal to 400 nanometers, for forming force-independent conductivity, a thin insulating film disposed between the first and second metal electrodes in a form-locked manner, a reference metal electrode disposed on a section of the thin insulating film such that it is force-decoupled from the first metal electrode and tensioned with respect to the second metal electrode at a constant retaining force by a fastening element, and a measuring circuit designed as a half bridge or a full bridge.

15 Claims, 12 Drawing Sheets

(56) References Cited

U.S. PATENT DOCUMENTS

| | | | |
|---|---|---|---|
| 9,715,302 B2* | 7/2017 | Kim | G06F 3/044 |
| 2003/0089177 A1 | 5/2003 | Luthje et al. | |
| 2003/0164047 A1 | 9/2003 | Fujita | |
| 2012/0090409 A1 | 4/2012 | Luthje et al. | |
| 2015/0243729 A1* | 8/2015 | Pavageau | H01G 5/16 257/532 |

* cited by examiner

DEVICE FOR ELECTRICALLY MEASURING A FORCE

FIELD

The invention relates to a device for electrically measuring a force built between at least two metal electrodes, wherein at least one thin insulating film acts as a sensor element, the electrical conductivity of which describes an unambiguous and exactly traceable function of the acting force.

In general, the invention relates to the field of force measurement technology, wherein a novel application variety is achieved over the prior art by creating a simplified design of the force sensors without deformation bodies. A configuration feature used here is the application of at least one or more homogeneous thin insulating films onto the planar or free-form surfaces of the mechanical force transmission elements, whereby between the electrically insulated force transmission elements and the metal electrodes a sensor design becomes possible which, directly and without noteworthy deformation of these elements, generates an electrical signal in the form of a force-dependent change in voltage at a given current, the signal describing the bijective, high-resolution and continuous representation of the applied force on a direct mechanical and electrical route.

This technology makes it possible to create sensors that have high temperature stability, depending on the selected thin insulating film, and a miniaturized design, which is to say in an installation space of less than one cubic millimeter for force measurement in the millinewton range, and furthermore in an arbitrarily large macro design in the newton to meganewton range, wherein, depending on the measuring task, an arbitrary geometric configuration of the mechanical force transmission elements comprising applied thin insulating films a free selection with regard to installation space, force application direction and mechanical amplification ratios is achieved.

For example, as a result of being able to freely select the cone slope of the inner and outer truncated cones, to the outer cone lateral surface of which a thin insulating layer was applied, free design selection of the measuring sensitivity to be achieved is made possible, wherein tension or compression sensor becomes possible, depending on the geometric configuration. An additional degree of freedom in the mechanical and electrical configuration of the force sensors is the material selection, the design and the chemical composition of the thin insulating film, or of the layer system, applied to the force transmission elements, wherein the temperature stability and the measuring sensitivity of the thin insulating film can be freely selected depending on the requirements of the measuring task. Additionally, it becomes possible to configure miniaturized and larger combinations of multiple force sensors by way of thin insulating films in the design of a combined sensor unit, for example so as to detect, without interactions, the action of the force and the direction of the force with respect to the 3 spatial dimensions of width (x component), length (y component) and depth (z component) in the space.

In general, the piezoresistive effect is sufficiently known from the related art and first publications that became known as early as 1920. The piezoresistive effect describes a change in the electrical resistance of a material as a result of the application of a high external force or pressure. This effect occurs in all materials that are moderately to highly electrically conducting; however, compared to metals the pressure sensitivity of semiconductors is several times greater. In principle, it should be noted that this pressure sensitivity based on the change in resistance due to the application of an external force can be increased in semiconductors by deliberately adapting the orientation of the monocrystal, which means the direction of flow of the electrical current, and the doping with impurity atoms in the carrier material.

The piezoresistive effect can also be observed on the example of amorphous carbon layers having a diamond-like lattice structure, as is described in patent DE 199 54 164 B4, wherein it should be noted that it is not only possible to influence the intensity of the piezoresistive effect in amorphous carbon layers by way of a specific chemical composition and configuration of the lattice structure, but great intensification of the piezoresistive effect is likewise achieved with other thin films or multilayer systems, such as aluminum-titanium-nitrite, aluminum-chromium-nitrite, zirconium-oxide-nitrite or aluminum-chromium-nitrite-oxide, and many others, by integrating impurity atoms or molecule structures as grains in a nanocomposite carrier layer. This means that the sensitivity of the change in electrical resistance with respect to the degree of the force or pressure mechanically applied from the outside is drastically increased since, depending on the material combination and introduced impurities, additional charge carriers in the form of ions and/or electrons are released in the semiconductors as a function of the pressure. This effect has been known since 1920; however, technical progress and continued development regarding the use and production of layer systems has yielded novel material combinations and layer systems that, on the one hand, can be applied to a wide variety of materials, such as metal, ceramic, glass or plastic surfaces, and, on the other hand, have a material composition that comes very close to semiconductors with respect to the electrical properties.

Such piezoresistive layers, however, exhibit very strong temperature-dependent drift of the resistance, which as a relative temperature-dependent change in resistance is in a range of −0.4 percent to approximately −1.2 percent per kelvin increase in temperature, which has likewise been described in the related art. Such layers and structures, for example, allow discrete electronic components and circuits to be configured on planar carrier materials, for example glass, such as are used in the production of modern flat screen monitors. Surfaces thus coated are also characterized by extreme mechanical strength exceeding that of hard metals, having compressive strength of more than 2 gigapascals and temperature stability in the range of minus 100 degrees Celsius up to 1200 degrees Celsius, depending on the selection of the carrier body and the applied layer system.

BACKGROUND

DE 10 2010 024 808 A1 describes a sensor design comprising a piezoresistive thin carbon film having a structured arrangement and measurement electronics. Only carbon (diamond-like carbon, DLC) layers are used. Such layers have very low resistance. The piezoelectric functional layer is structured, resulting in high manufacturing complexity for creating the force entry surfaces. Additionally, the functional layer made of DLC is coated with a wear protection layer, which can cause electrical disturbance variables in the measuring system.

US 2003/0164047 A1 describes a load sensor comprising a load detecting element and a temperature compensating element, wherein these two elements are made of the same material and have the same dimensions.

DE 102 53 178 A1 describes the use of a layer made of diamond-like carbon as a temperature sensor, which is preferably used in areas of machines subject to tribology. Furthermore, the option of simultaneously measuring pressure and temperature at different locations of layer regions is mentioned.

SUMMARY

The invention relates, in general, to a device for electrically measuring a force F, which acts at least between two compressed metal electrodes 1 and a metal electrode 3. The metal electrodes are made of hard metal, steel or low-resistance metal layers on ceramic, glass or plastic bodies having electrical resistance in the range of a few milliohms to less than or equal to ten ohms, and having a mean roughness value Ra of less than or equal to 400 nanometers, and have force-independent conductivity on the contact surfaces. The force acts directly on a thin insulating film 2 or a thin multi-layer insulating film 2 disposed between a metal electrode 1 and a metal electrode 3 in a form-locked manner, which is made of zinc oxide or stochastically reduced aluminum oxide $Al_2O_x$, where x=2.4 to x=2.8, or silicon carbide or a DLC (diamond-like carbon) layer, under the slightest relative deformation in the range of smaller than or equal to 0.1% of the metal electrode 1 and the metal electrode 3. Due to the identical thin insulating film 2 or the thin multi-layer insulating film 2 exhibiting exactly the same physical behavior, a reference metal electrode 4, which is disposed independently of the flow of the force to be measured and fixed under the constant holding force of a fastening element 5, acts electrically on the metal electrode 3, so that this reference resistance of the thin insulating film between the metal electrode 3 and the metal electrode 4 is applied under a constant pressing force for complete temperature compensation of the measuring system as a half bridge or a full bridge, in that a defined current of a high-precision power source 6 flows on the current path in a series connection via the metal electrode 1 across the thin insulating film 2 to the metal electrode 3 across the thin insulating film 2 to the metal electrode 4, so that a force-dependent voltage 8 drops across the thin insulating film between the metal electrode 1 and the metal electrode 3, and a reference voltage 9 drops between the metal electrode 3 and the metal electrode 4 of a thin reference insulating film 2, the voltage ratio thereof being temperature-independent, wherein the resulting bridge voltage of the measuring bridge or the directly measured voltage ratio defines a continuous, high-resolution and exactly describable and repeatable function of the acting force, regardless of the operating temperature of the device for electrically measuring a force, wherein the temperature-compensated voltage ratio or the measured bridge voltage is directly supplied to a signal processing and evaluation unit via an electrical connection, whereby an electrically decoupled and mechanically robust design of the force measuring device according to the invention is achieved. A geometry of the metal electrodes 1, 2 and 3 can be freely selected in the form of planar surfaces or free-form surfaces.

One embodiment of the device is characterized in that, during the creation of the contact surfaces of the at least two metal electrodes having a mean surface roughness Ra of less than or equal to 400 nanometers, a form fit in the range of less than 4 micrometers across the entire contact surface is achieved, whereby the electrical resistance between the contact surfaces of the at least two or more metal electrodes 1, metal electrodes 3 and metal electrodes 4 without thin insulating film, which are produced, for example, from hard metal or high-strength steel, or by way of metal injection molding, or low-resistance metal layers on ceramic, glass or plastic bodies having electrical resistance in the range of less than a few milliohms to less than or equal to ten ohms, regardless of the applied force at which these metal bodies are pressed together, remains constant within the tolerance range of plus/minus 3 milliohms and, depending on the material used and the surface area of the contact surface, is established in the range between 20 milliohms and no more than 160 milliohms, whereby the metrological condition is created that only the thin insulating film 2 detects a force-dependent change in resistance.

One embodiment of the device is characterized in that the thin insulating film 2 is applied to hard metal electrodes, steel electrodes or metal layer electrodes on ceramic, glass or plastic bodies having electrical resistance in the range of less than a few milliohms to less than or equal to ten ohms, so that the electrode base body of the metal electrode 1, metal electrode 3 and metal electrode 4 has at least the same strength as, or greater strength than, the thin insulating film 2, whereby deformation and damage of the thin insulating film in relation to the carrier material due to pressing or flaking is avoided, and the measuring system are not deformed by the application of the force, or to an extremely small degree, which is to say a relative deformation of less than 0.1%, so that the entire force measuring system operates without displacement due to deformations of the mechanical metal electrodes 1, the metal electrodes 3 and the metal electrodes 4, and the application of the force on the thin insulating film is thus converted into a direct change in resistance, which is an unambiguous, high-resolution and continuous function of the force.

One embodiment of the device is characterized in that the mechanical transmission elements, serving as metal electrodes 1, metal electrodes 3 and metal electrodes 4 for passing on the force between the outer force application site to the thin insulating film 2 of the force measuring device and the thin reference insulating film 2, which is disposed between the metal electrodes 3 and metal electrodes 4, are made of high-strength steels or hard metals, by way of metal injection molding, ceramic or glass materials, having special high-strength layers or layer systems applied, which are made of silicon carbide, DLC (diamond-like carbon), zinc oxide or stochastically reduced aluminum oxide $Al_2O_x$ having an oxygen ratio of x equal to or greater than 2.4 to 2.8, whereby very high mechanical and chemical robustness, dimensional stability and freedom from wear of the elements of the measuring cell, comprising the metal electrodes 1, the metal electrodes 3 and the metal electrodes 4 and the thin insulating layer 2, is achieved, and this measuring cell withstands thermal loading of the thin insulating film 2 and the electrical contact with the electronic measurement evaluation circuit of the components (6, 7 to 17) in the vicinity of the measuring device at a spatial distance of less than or equal to 200 millimeters, so that the measuring system is operated in the temperature range of less than −80° C. to +300° C., wherein far in excess of one hundred thousand operating cycles do not result in any change of the unambiguous force-resistance function of the thin insulating film 2 or the thin multi-layer insulating film 2.

One embodiment of the device is characterized in that the load cell, comprising the metal electrodes 1, the metal electrodes 3 and the metal electrodes 4 and at least one thin insulating film 2, are implemented as high-temperature applications in the temperature range of −80° C. to +1100° C., and up to +1200° C. in isolated cases, by using a temperature-resistant electrical connection between the thin insulating film 2 and the electronic evaluation unit of the components (6, 7 to 17), wherein the metallic conductor and insulator and the contact surfaces of the connection system are temperature-resistant up to 1200° C., having line lengths of greater than 20 millimeters up to 5 meters, due to the specific selection of the insulating film system 2 [SiC, $Al_2O_x$, ZnO].

One embodiment of the device, which is configured in a miniaturized and compact design for electrically measuring a force F in the millinewton to meganewton range, is characterized in that a composition of the force measuring system that is very robust and tolerates dynamic loads is achieved as a result of the mechanical design of the metal electrodes 1 the metal electrodes 3 and the metal electrodes 4, wherein the mean roughness value Ra of the metal electrode contact surfaces 1 and the metal electrode contact surfaces 4 at a ratio of 30:1 to 2:1 are rougher compared to the mean roughness of the metal electrodes 3 of Ra equal to or less than 200 nanometers, whereby the increase in the continuous force-resistance characteristic curve of the measuring cell is deliberately defined in an application-specific manner in that a roughness ratio of 1:1 of the electrodes produces a significantly lower increase in the force-resistance characteristic curve compared to a higher ratio of X:1, where X=1.5 to 30.0, which causes a significantly steeper increase in the force-resistance characteristic curve. Furthermore, the metal electrode contact surface is configured as a shaped part, wherein planar surfaces or free-form surfaces are used, having defined surface roughness, which increases the adhesion of the high-strength coatings on the force transmission surfaces, whereby a strength of the thin insulating film 2 or of the thin multi-layer insulating film 2 and of the base bodies of the metal electrode 1, the metal electrode 3 and the metal electrode 4 the pressure load-bearing capacity of hard metals of up to 2 gigapascals or of high-strength steels of up to 1.2 gigapascal is achieved. Due to the selection the production method of the thin insulating film 2 in terms of the material selection and material treatment using available coating techniques, specific resistance characteristic values or working ranges of the force-dependent insulating behavior in the milliohm, ohm to several hundred kiloohm range are established, which in a smaller design having an installation space of a few cubic millimeters operate for the millinewton range, in an average size in the range up to one hundred cubic centimeters operate in the newton to kilonewton range, and in a large design below one cubic meter operate in the meganewton range.

One embodiment of the device is characterized in that the measuring device of the elements (1, 2, 3 to 17) is electrically operated in the form of a half or full measuring bridge by combining multiple thin insulating films 2 or thin multi-layer insulating films 2, so that the measuring sensitivity is increased several times over specifically by the electrical interconnection. As a result of one or more respective reference metal electrodes 4 per load cell, the temperature-related resistance deviation is entirely compensated for. Furthermore, a spatial arrangement of the one measuring cell combination, comprising metal electrodes 1 and metal electrodes 3, thin insulating films 2 and reference metal electrodes 4, in the direction of the force application to be measured, and a second spatial arrangement of the elements (1, 2, 3 and 4) of the second measuring cell combination in the direction of the interfering force component, which is caused as a mechanically superimposed oscillation in the system, for example, make it possible to operate a half or full measuring bridge as an electrical differential connection, whereby disturbing signals can be deliberately reduced, or entirely compensated for, by parasitic mechanical oscillations.

One embodiment of the device is characterized in that the measuring device is electrically operated as a multiple series connection of multiple measuring channels by way of one or more half or full measuring bridges by combining multiple thin insulating films (2.1 corresponds to channel one, and 2.2 corresponds to channel two) or thin multi-layer insulating films (2.1, 2.2 to 2.$n$), the spatial or geometric arrangement of the bridges being designed in such a way that the magnitude and direction of the forces to be measured can be exactly and simultaneously determined as a vector quantity for each associated measuring channel by separately detecting the force application as vector components in the at least three spatial dimensions of the Cartesian coordinate system, having a width-X, length-Y, and height-Z, and/or additionally in the polar coordinate system of the rotational axis about the normal vector of the X-Y plane, the Z axis and a further rotational axis, which bijectively describe the angle of inclination with respect to the X-Y plane.

One embodiment of the device is characterized in that both simple and complex mechanical designs of the elements, these being the metal electrodes 1, the thin insulating films 2, the metal electrodes 3 and the reference metal electrodes 4, are created as the electrical force measuring device, which by way of the thin insulating films 2 are composed as a combination of one or more electrical force measuring devices, comprising single layers (2) or multiple layers (2 or 2.$n$) applied to a few shaped parts as planar or free-form surfaces, in a macro design, which is to say in the range of greater than 10 mm, as well as as a miniaturization in a micro design, which is to say in the sub-millimeter range, wherein multiple metal and/or ceramic and/or glass components are disposed in a force-fit or form-locked manner and detect moments as well as forces in a temperature-compensated manner, wherein, as a result of the application of high-resistance insulating layers in the megaohm range, these components are operated as metal electrodes 1, 3 and 4 in a manner that is electrically insulated with high resistance with respect to the external environment and sufficiently electrically insulated with respect to one another, and mechanically as well as electrically decoupled from one another without interactions.

One embodiment of the device is characterized in that the establishment of the measuring sensitivity of the electrical force measuring device is defined with respect to the force measuring range in the millinewton to meganewton range, and that furthermore the direction of force is predefined by the geometric configuration of the metal electrodes 1, the metal electrodes 3 and the reference metal electrodes 4, in that these are designed and manufactured as insertable bodies having freely selectable ruled geometries as positive and negative shapes, the dimensional deviation of which is smaller than or equal to 6 micrometers at a mean roughness value of the electrode contact surface of Ra smaller than or equal to 400 nanometers, for example as an inside truncated cone and an outside truncated cone of lateral surfaces having the same shape for measuring tensile or compressive forces, having the thin insulating film 2 applied to the lateral surface, wherein the cone angle, and thus the mechanical multiplication ratio of the compression or tension measuring cell, can be freely selected. Furthermore, as a result of cylinder surfaces, inserted into one another, of the outer cylinder and inner cylinder having thin insulating films applied to the cylinder lateral surface, it is achieved that the radial tension force is detected, and thus the radial and axial force transmission capacity of shrink joints between cylindrical tensioning systems is measured directly, wherein this is linearly detected as a force acting between two bodies. In a further exemplary embodiment, it is possible, for the design freedom in terms of the configuration of this measuring system, to directly measure axial tensile or compressive forces with the aid of stepped cylinders, wherein the thin insulating film 2 of the two or more shaped parts is applied to the end face of the cylinder rings, and thus the axially acting tensile or compressive force of the pressed-on shaped parts is directly linearly detected in a linear manner, and likewise the direct measurement of torque is made possible in that, due to a planar bearing surface between the metal electrodes 1 and the metal electrodes 3 and the interposed thin insulating film 2, having a normal vector pointing tangentially to the direction of rotation, of the mutually engaging, rotationally symmetrical shaped parts, wherein the thin insulating film is applied to a planar surface or free-form surface of a shaft, the normal vector of which points in the direction of the force to be measured acting on the cylinder circumference of the two bodies as a rotation.

One embodiment of the device is characterized in that the metal electrodes are electrically insulated from one another by one or more thin insulating layers (2 or 2.$n$) and, mechanically, they are designed as a ruled geometry or free-form geometry in such a way that at least two-channel or multi-channel simultaneous measurement of compressive and tensile forces is possible by applying the thin insulating film to the circumferential surface of two mutually connected truncated cones on the outer surface of the respective inner electrode, which are mounted respect to the precisely fitting casing, which is to say with a surface roughness having a mean roughness value of less than 400 nanometers and dimensional tolerance of less than 6 micrometers, as two outer electrodes that are electrically insulated from one another as a negative shape, wherein no deformation or an extremely small relative deformation of less than 0.01% takes place of the metal electrodes 1, the metal electrodes 3 and the reference metal electrodes 4, which are made of hard metal for example, and the thin insulating film 2 on the truncated cone having a tip in the direction of the force application measures a compressive force, and the truncated cone having the tip counter to the force application measures the tensile force, and this electrical force measuring device thus simultaneously allows a force measurement in opposite force directions as positively and negatively acting forces.

During the electrical measurement of a force by way of the thin insulating layer 2 using the above-described device, an electronic precision signal generator is used as the power source 6, which operates either in the operating mode of a regulated direct current source or furthermore in the operating mode of an alternating current signal source, so that clearly defined output current signals, usable as an exact reference, in the form of sinusoidal, square wave or triangular signals, for example, are supplied, with freely selectable amplitudes and frequencies of the resistance measuring circuit. Furthermore, a signal processing and evaluation circuit is matched to the respective operating mode so that, depending on the application, electrical disturbance variables from the surrounding environment, which is to say strong electrical or electromagnetic fields, are deliberately suppressed or compensated by way of signal filtering using a band pass filter or a band stop filter, having cut-off frequencies that are designed with the specific application in mind. Likewise, a reduction in the energy consumption of such a measuring system by more than 2 to 4 powers of ten is achieved in pulse/no pulse mode.

The dynamics of the thin film force measuring system, comprising the metal electrodes 1, the thin insulating films 2, the metal electrodes 3 and the reference metal electrodes 4, or of the combination of electrical force measuring devices by way of thin insulating films of the elements (1, 2, 3 and 4), supplies a temporal resolution in the megahertz range of force curves that takes place exclusively as a result of the design of the thin insulating films 2 and the thin reference films 4 as low-resistance measuring resistors in the range of less than or equal to one hundred ohms to one ohm. In this way, the increase in the measuring currents, and in particular the edge steepness of the detected measuring voltage, which is detected as a voltage drop across the thin insulating film resistor and achieved in the lower microsecond to ten nanosecond range. The measurement electronics is electrically adapted to detect the voltage drops across the thin insulating films (2 or 2$n$) with a resolution to no less than the three-digit microvolt range at a time delay of less than eight hundred nanoseconds, so that the performance capability of the entire measuring system with respect to the time response and sensitivity is determined exclusively by this adaptation, and thus temporal high-resolution and deformation-free force measurement is made possible, which is carried out on bearing shells of turbines or high-voltage generators, for example.

The mechanical transmission elements for passing on the force to the metal electrodes 1, the metal electrodes 3 and the reference metal electrodes between the outer force application site to the thin insulating film 2 are made of strong plastic materials or high-strength composite materials in the form of shaped parts, wherein the electrical force measuring system is created on the carrier material of the electrode base bodies made of plastic material or composite material of the metal electrodes (1, 3 and 4) as a result of the application of high-strength metal layers as the electrically conducting metal electrode of the elements (1, 3 and 4), the application of the thin insulating films (2 and 2.$n$) onto these metal electrodes (1, 3 and 4), and furthermore as a low-resistance electrical contact of these electrodes with the electronic measuring system in the resistance range of less than fifty milliohms of the elements (6, 7, to 17).

The metal electrodes 1, the metal electrodes 3 and the metal electrodes 4 are electrically insulated from one another by a thin insulating film 2, so that the capacitance and/or the resistance of this electrical measuring cell, comprising the elements (1, 2, 3 to 17), represents an unambiguous and continuous function of the applied pressure force acting on the measuring cell from the outside, wherein, for the purpose of electrically measuring the force-dependent capacitance C or the impedance Z, an electronic precision signal generator, which operates in the operating mode of a regulated alternating current signal source, is used as the power source, so that clearly defined output current signals, usable as an exact reference, in the form of sinusoidal, square wave or triangular signals, for example, are supplied, with freely selectable amplitudes and frequencies of the capacitance or impedance measuring circuit, and these, serving as an oscillating circuit, provide excitation at the resonant frequency, wherein the oscillating circuit is detuned as a result of the force acting between the metal electrodes (1, 3 and 4) due to a change in capacitance and/or impedance, and likewise the amplitude of the alternating current measuring signal drops across the capacitive-resistive resistance of the thin insulating film 2, the curve of which describes a bijective and continuous function with respect to the applied pressure force, and the electronic signal processing and evaluation circuit, by way of application-specific band stop filters or band pass filters, achieves almost complete suppression or compensation of disturbance signals as a result of parasitic mechanical oscillations or electrical fields from the surrounding environment.

The metal electrodes 1, the metal electrodes 3 and the metal electrodes 4 are electrically insulated from one another by a thin insulating film 2, so that the impedance Z, which is to say the inductive AC resistance or capacitive AC resistance, of this electrical measuring cell represents an unambiguous and continuous function of the applied pressing force acting on the measuring cell from the outside, wherein, for the purpose of electrically measuring the force-dependent inductance L or capacitance C, an electronic precision signal generator, which operates in the operating mode of a regulated alternating current signal source, is used as the power source, so that clearly defined output current signals, usable as an exact reference, in the form of sinusoidal, square wave or triangular signals, for example, are supplied, with freely selectable amplitudes and frequencies of the capacitance or inductance measuring circuit, and these, serving as an oscillating circuit, provide excitation at the resonant frequency.

DETAILED DESCRIPTION

Figure 1:
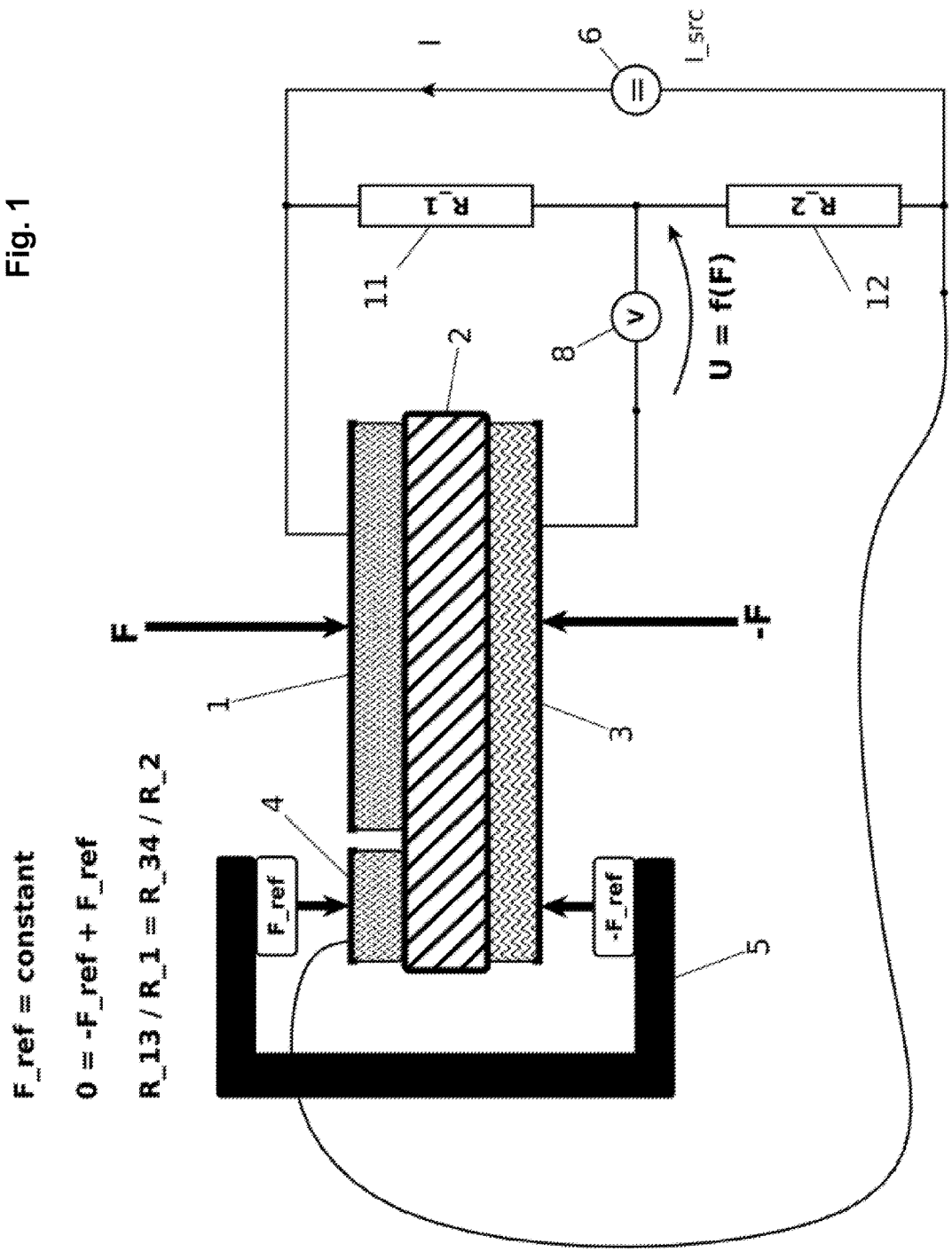
FIG. 1 shows a sectional illustration of the thin insulating film load cell comprising a thin reference insulating film for temperature compensation, serving as an electrical half measuring bridge.
Figure 2:
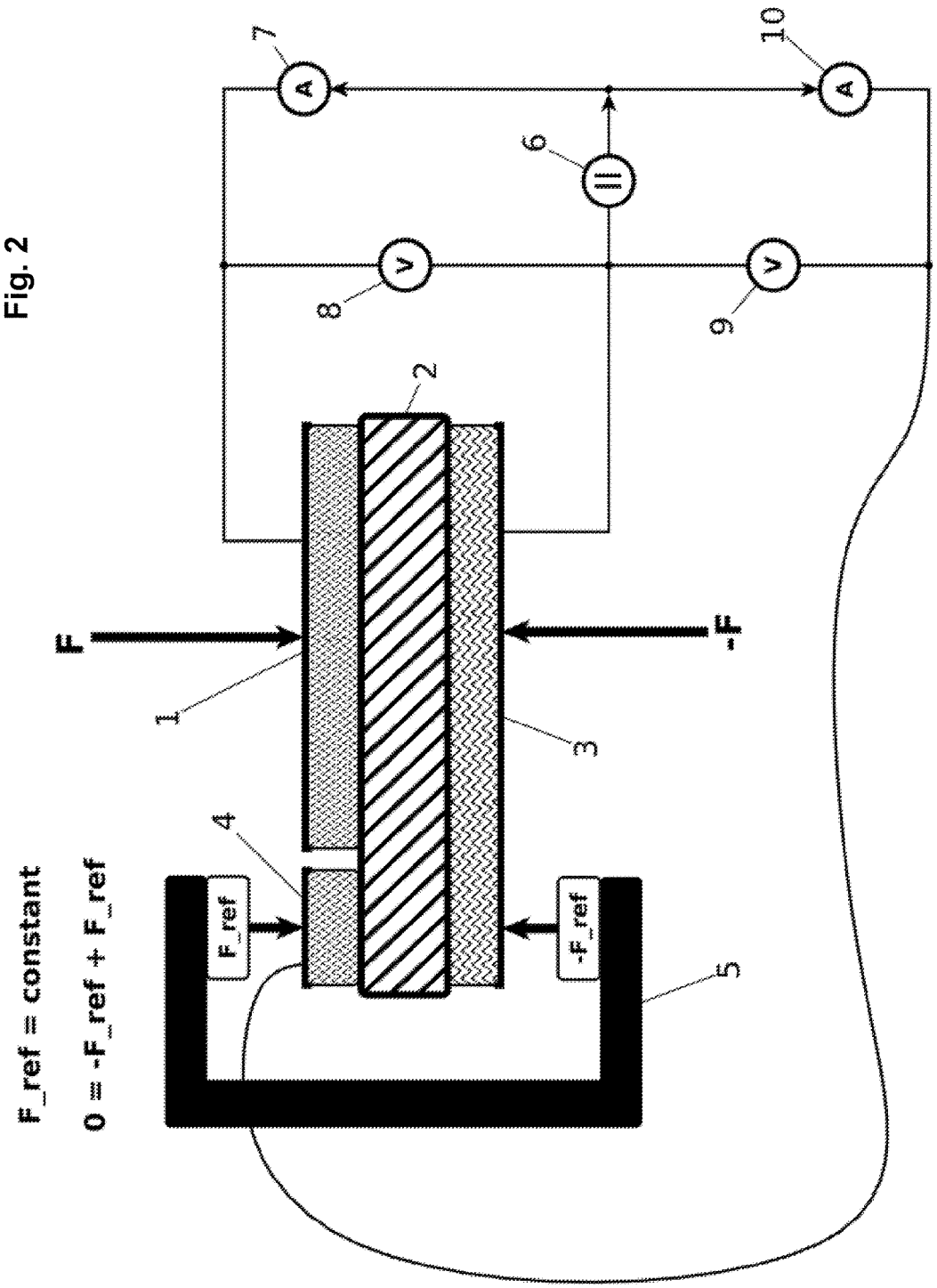
FIG. 2 shows a sectional illustration of the thin insulating film load cell comprising a thin reference film for temperature compensation for resistance measurement.
Figure 3:
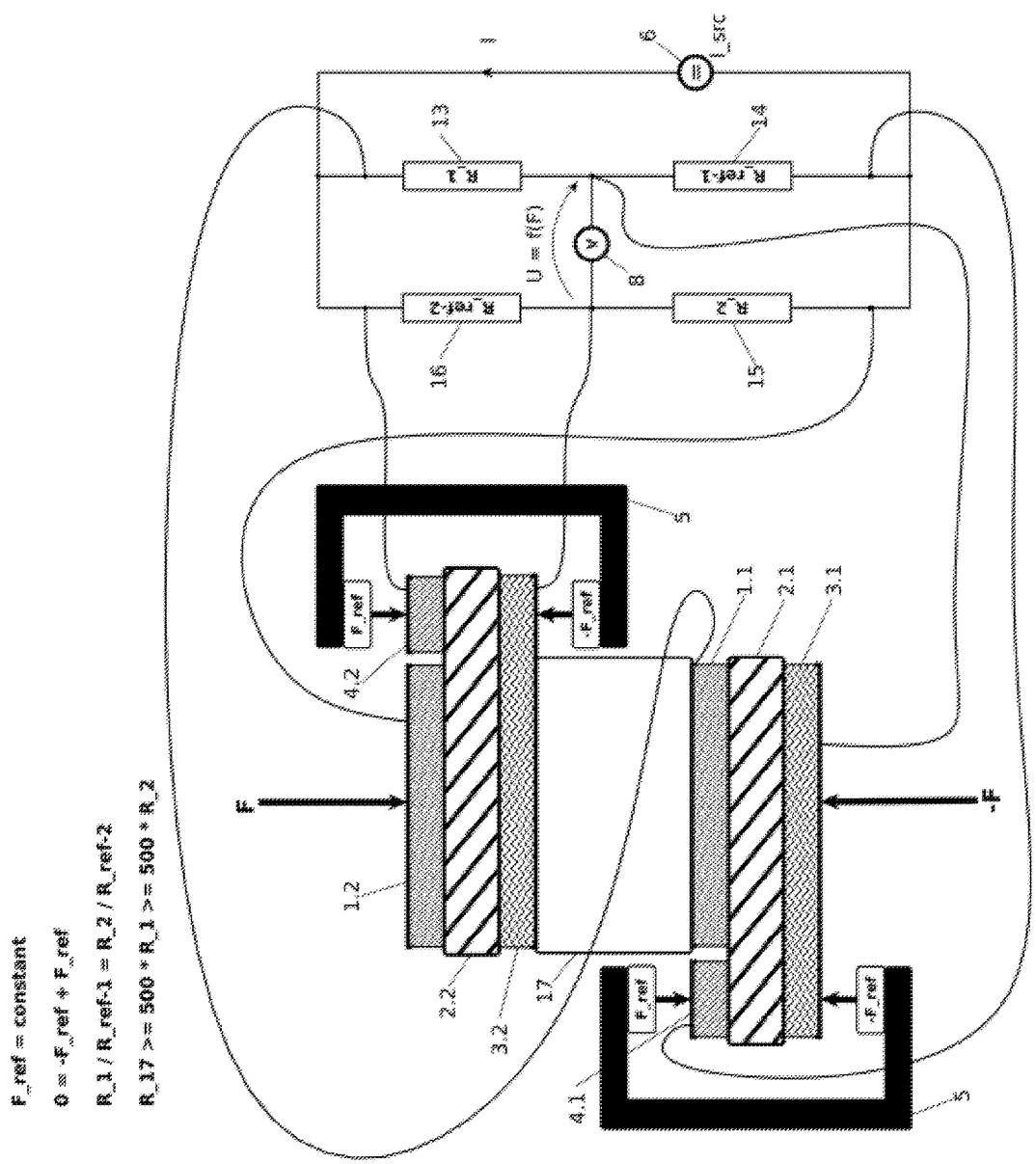
FIG. 3 shows a sectional illustration of the thin insulating film load cell comprising a thin reference insulating film for temperature compensation in a double design, serving as a highly sensitive full measuring bridge.

According to the invention, the measurement of forces is achieved, as shown as exemplary embodiments in FIG. 1, FIG. 2 and FIG. 3, in that an insulating thin film (2) is applied between at least two mechanical force transmission elements (1 and 3), which are designed as electrodes electrically insulated from one another, the electrical resistance of the thin insulating film being a clearly traceable function of the acting force F, and furthermore a reference metal electrode (4) is disposed in the vicinity outside the power flow, the mounting of which fixes this electrode (4) at a constant retaining force with respect to the source electrode (3).

In this way, a half or full measuring bridge can be created, which fully compensates for the temperature dependence of the measuring system, whereby the resulting bridge voltage describes a bijectively traceable function of the force application between the electrodes (1 and 3), regardless of the ambient temperature. For this purpose, the at least two electrodes (1 and 3), or the shared source electrode (E_q or 3), and the adjoining sensor electrodes (E_n) thereof, are electrically connected to the power source (6), so that the given and known current I_q of the regulated power source (6), which is measured as a current I by way of an ammeter (7), resulting in a voltage drop U or U_n across the thin insulating film on the multidimensional sensor, which is measured in a high-resolution manner by way of a voltmeter (8) and transferred as a bridge voltage with respect to one or more reference measuring electrodes (4 or U.ref(n)) using a half or full measuring bridge, whereby complete compensation of the temperature dependence of the thin insulating film resistance or of the measuring system is achieved.

In opposition to previously known solutions of force measuring sensors and, among other things, with respect to patents DE 199 54 164 B4 and DE 10 2006 019 942 A1, it should be cited that:
none of the force measuring systems based on piezoresistive thin insulating film systems described in the prior art comprises a device for fully and with high precision compensating for temperature-dependent drift of the insulation resistance;
a wide variety of thin insulating films and multi-layer systems having semiconductor behavior are employed, wherein the sensitivity thereof with respect to the force-dependent electrical conductivity or electrical resistance deliberately by way of specific manufacturing methods, chemical substance combinations and the introduction of impurities releasing additional electrical charge carriers, which considerably increase the force-dependent piezoresistive effect. Examples of such thin insulating films or thin insulating film combinations are aluminum-titanium-nitride, aluminum-chromium-nitride, zirconium-oxide-nitride or aluminum-chromium-nitrite-oxide, and many others, which, serving as semiconductors, exhibit strong sensitivity to the force-dependent change in resistance;

with respect to geometry and material selection, the mechanical force transmission elements are configured in such a way that no change in geometry or negligible deformation of the mechanical force transmission elements takes place, and thus a force measurement is directly converted into an electrically measurable signal without travel or displacement errors, which is to say the thin insulating film is the only sensor coupling member, and no other component tolerances and mechanical disturbances enter the measuring chain;

furthermore, for example in the sensor design comprising hard metal force transmission elements serving as the electrodes (1 and 3), electrically exactly defined contact resistances are achieved between the interfaces of the metal electrodes (1 and 3), the contact resistance of which in the milliohm range is exactly constant, regardless of the applied force under which these elements are pressed together;

the arbitrary, even miniaturized, design of the force measuring sensors or force measuring sensor combinations, serving as a multidimensional force measuring unit, makes an extremely rapid, high-resolution measuring unit possible, wherein the physical boundaries of this system are solely electrically limited by the charge/discharge times of the measuring currents or changes in voltage of the measuring circuit to the analog-to-digital converter. Modern electronic signal amplification and processing circuits open up an unprecedented performance level in dynamic force measurement;

depending on the selected thin insulating film or thin multi-layer insulating film system and the material composition thereof and accordingly robust force transmission elements, unprecedented temperature stability of such sensors in the range of less than one hundred degrees Celsius to 1200 degrees Celsius becomes possible;

energy-saving applications and very cost-effective miniaturized force measuring systems, operated by battery over many years, become possible since the measuring currents can be switched only briefly in active sleep mode with extremely long sleep phases, wherein very short settling phases of the measurement system enable a very short active duration;

the mechanical robustness and wear resistance of the thin insulating film exceeds the load limit of the mechanical coupling elements, for example 2 gigapascals of compressive strength for hard metal.

The option to implement multifaceted configurations, combined with the very high degree of freedom regarding miniaturization, normal sizes for mechanical standard elements, for example connecting elements such as bolts, screws, thrust washers and the like, all the way to applications in heavy equipment construction, is possible as a result of this measuring technology using thin insulating films.

Figure 4:
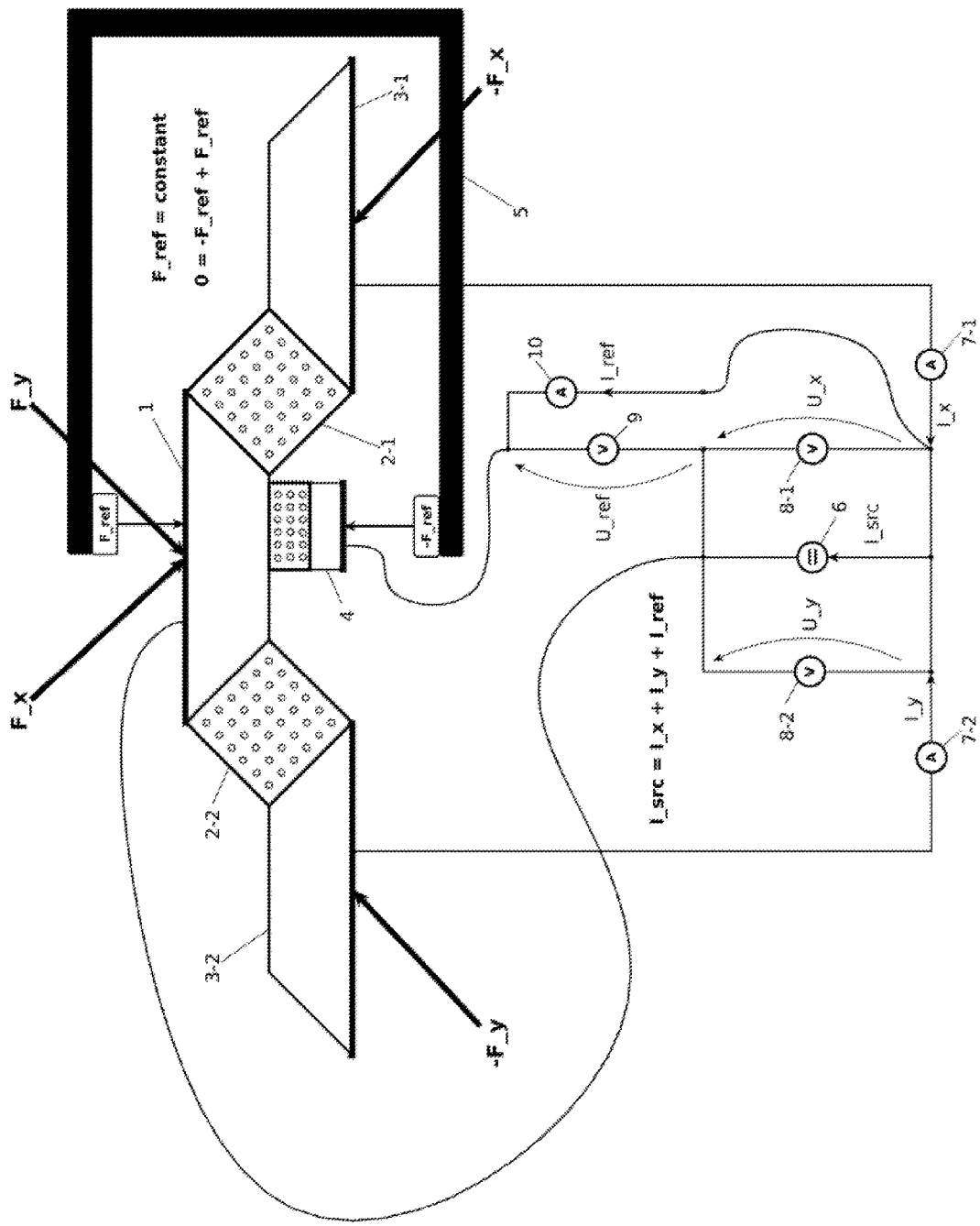
FIG. 4 shows a sectional illustration of the thin insulating film load cell for simultaneously detecting two force directions F_x and F_y comprising a thin reference insulating film for temperature compensation for electrical multi-channel resistance measurement.

The exemplary embodiment at the bottom of FIG. 4 shows a sectional illustration of the force measurement in one direction, and that at the top of FIG. 4 shows the component-based force measurement in two directions, which is to say in the two-dimensional space (2D) with the force components $F\_x$ and $F\_y$.

Figure 5:
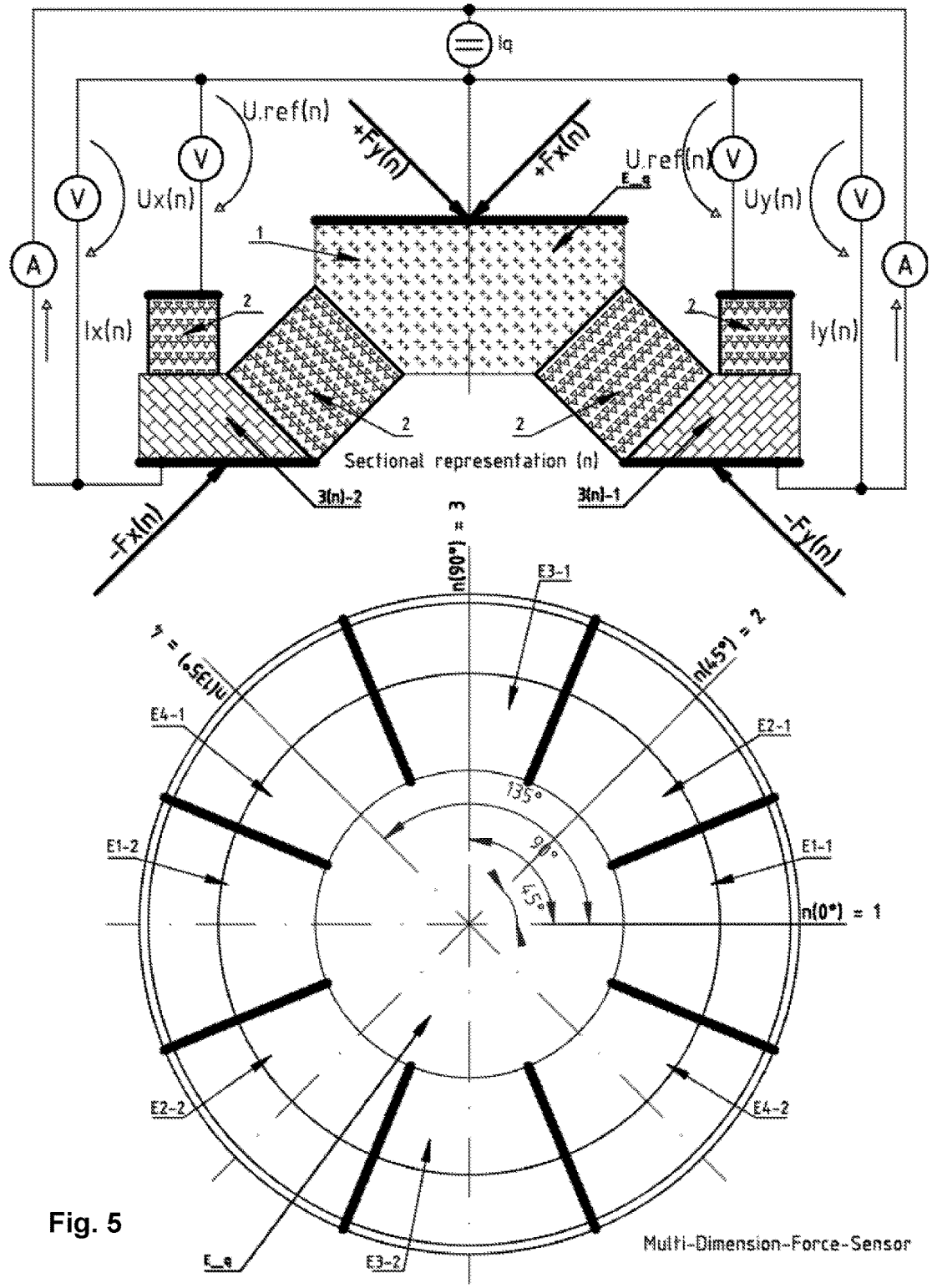
FIG. 5 shows the composition and measuring circuit of an N-dimensional thin insulating film force sensor comprising an n-fold measuring circuit having a multi-channel thin reference insulating film for temperature compensation;
top—sectional illustration of a 2D insulating film sensor segment;
bottom—rotational segment arrangement as an exemplary embodiment comprising n=4 times 2D sensor blocks and 4×2=8 measuring channels so as to measure the direction of the force and the magnitude thereof in a component-based manner;
Legend:
E1-1 and E1-2: electrode pair Fy+Fx rotation angle 0°;
E2-1 and E2-2: electrode pair Fy+Fx rotation angle 45°;
E3-1 and E3-2: electrode pair Fy+Fx rotation angle 90°; and
E4-1 and E4-2: electrode pair Fy+Fx rotation angle 135°.
Figure 6:
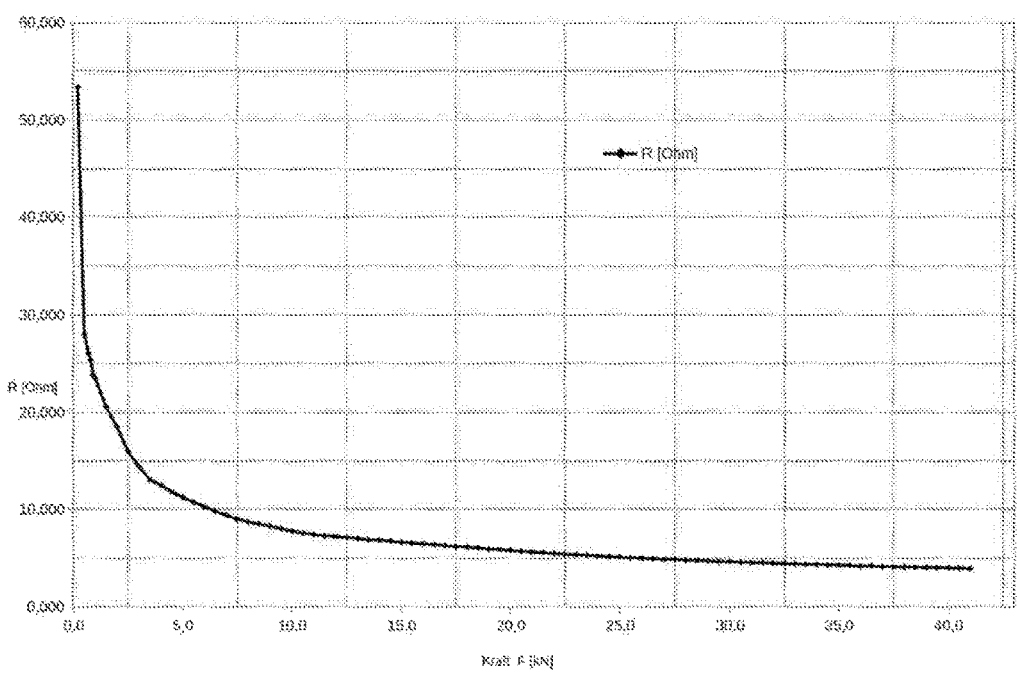
FIG. 6 shows a force-resistance characteristic curve of the thin insulating film measuring cell, comprising an uncoated hard metal electrode and a type_01 coated hard metal electrode.
Figure 7:
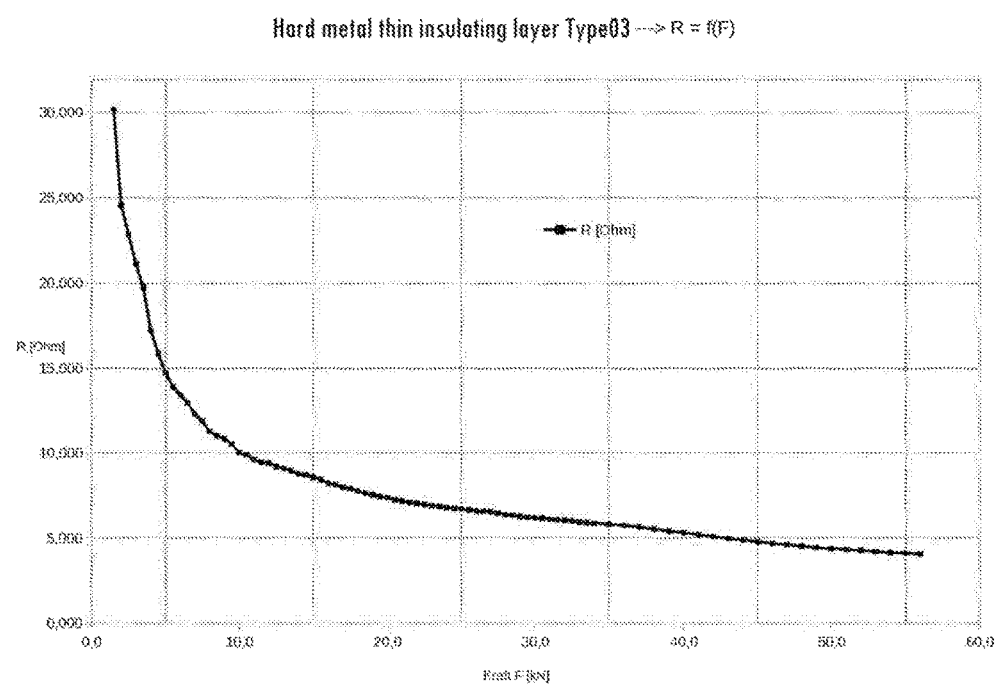
FIG. 7 shows a force-resistance characteristic curve of the thin insulating film measuring cell, comprising an uncoated hard metal electrode and a type_03 coated hard metal electrode.
Figure 8:
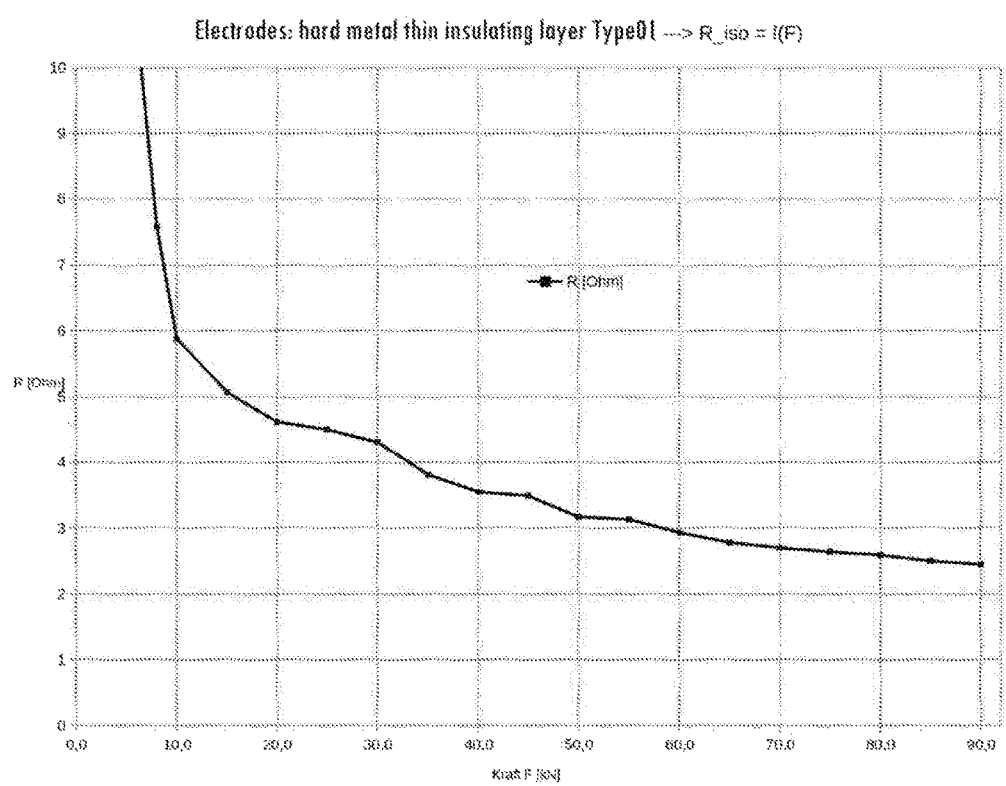
FIG. 8 shows a force-resistance characteristic curve of the thin insulating film measuring cell, comprising an uncoated hard metal electrode and a type_01 coated hard metal electrode.
Figure 9:
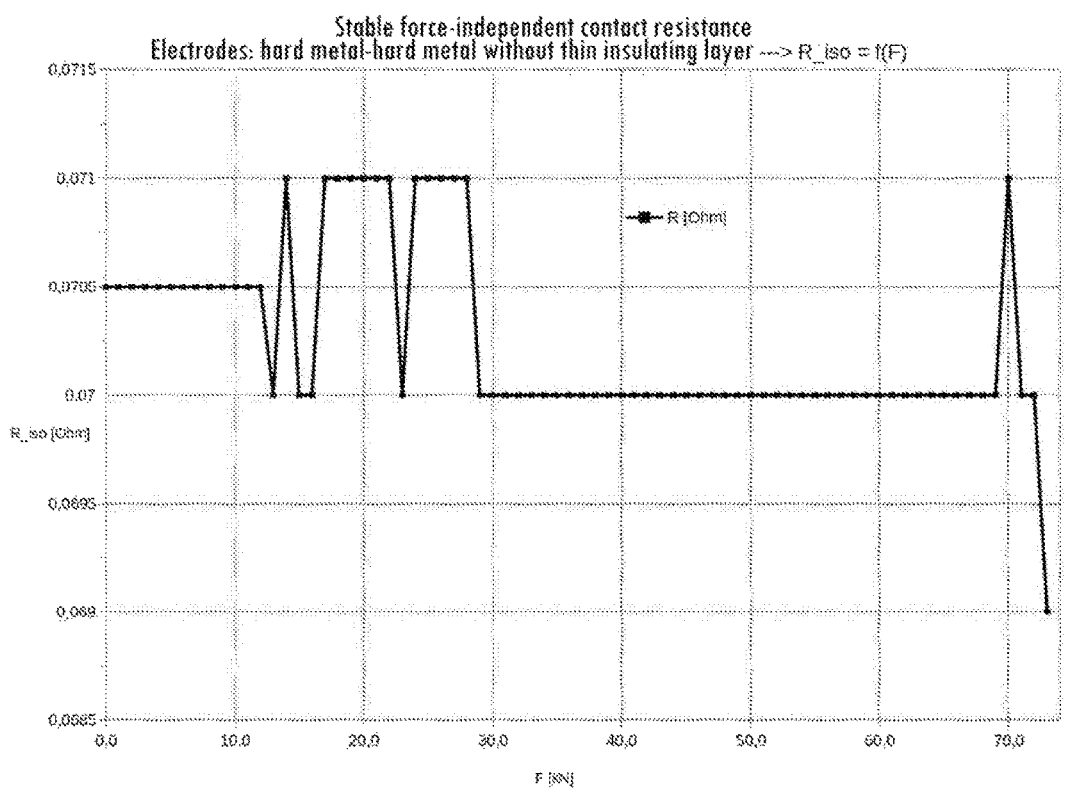
FIG. 9 shows a force-resistance characteristic curve of the thin insulating film measuring cell, comprising two uncoated hard metal electrodes, which is to say the resistance between the contact surfaces is in the lower milliohm range at +/−1 mOhm.
Figure 10:
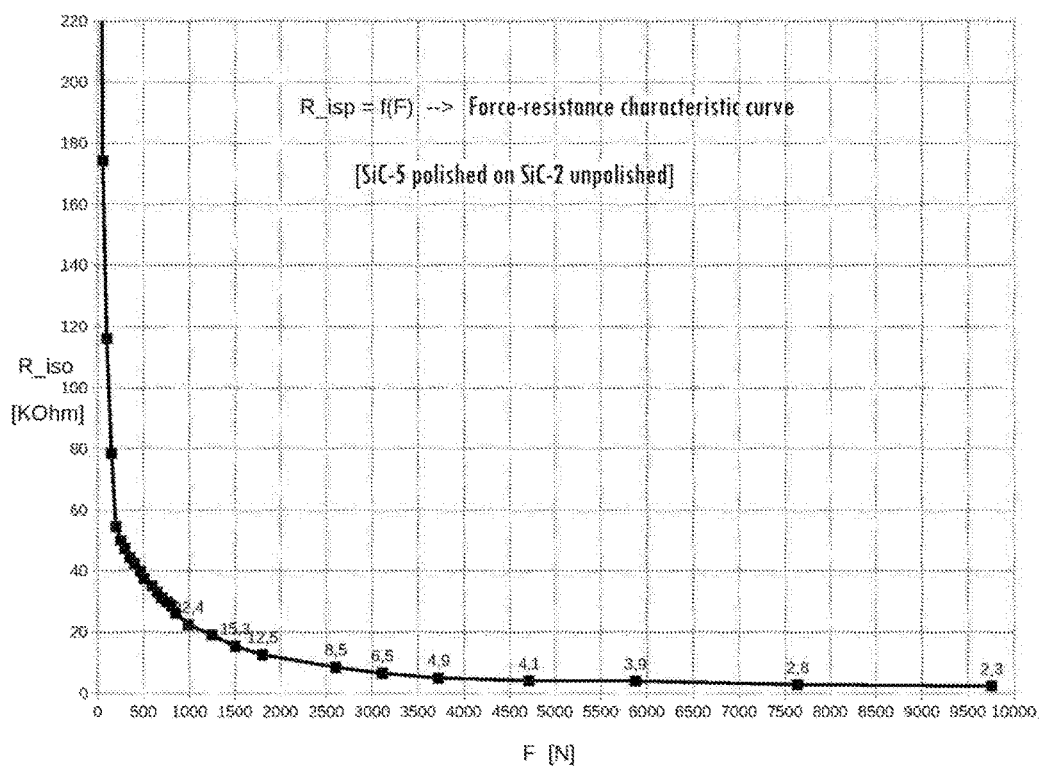
FIG. 10 shows a force-resistance characteristic curve of the thin insulating film measuring cell, comprising two uncoated hard metal electrodes, which is to say the resistance between the contact surfaces is in the lower milliohm range at +/−1 mOhm.
Figure 11:
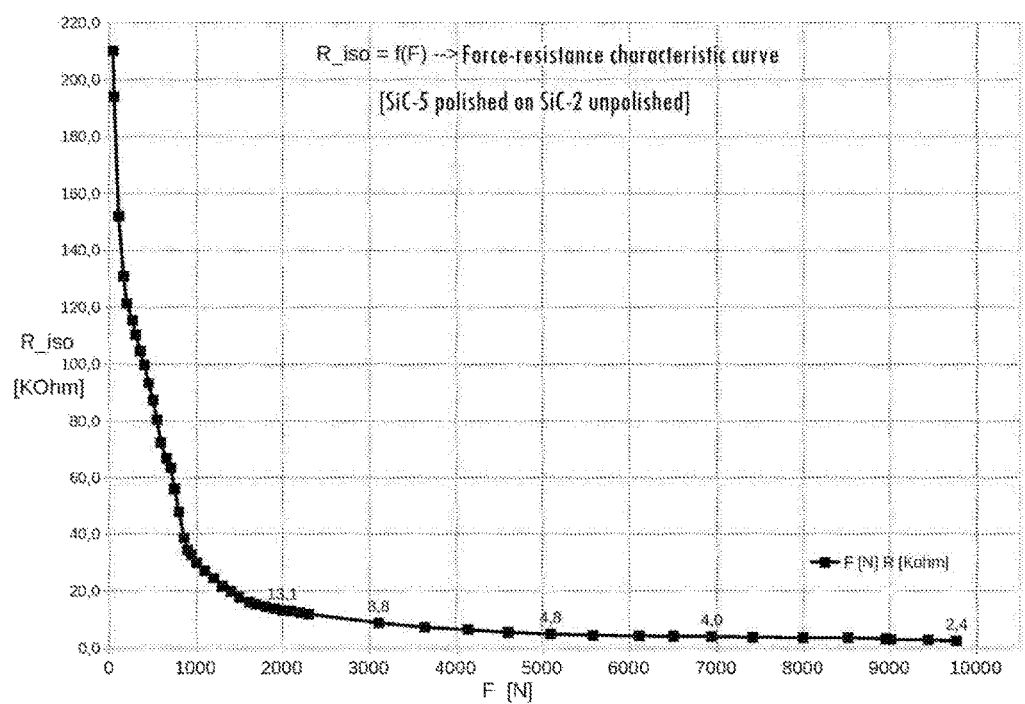
FIG. 11 shows a force-resistance characteristic curve of the thin insulating film measuring cell, comprising two coated hard metal electrodes having different roughness levels [SiC_05 polished on SiC_03 unpolished]
Figure 12:
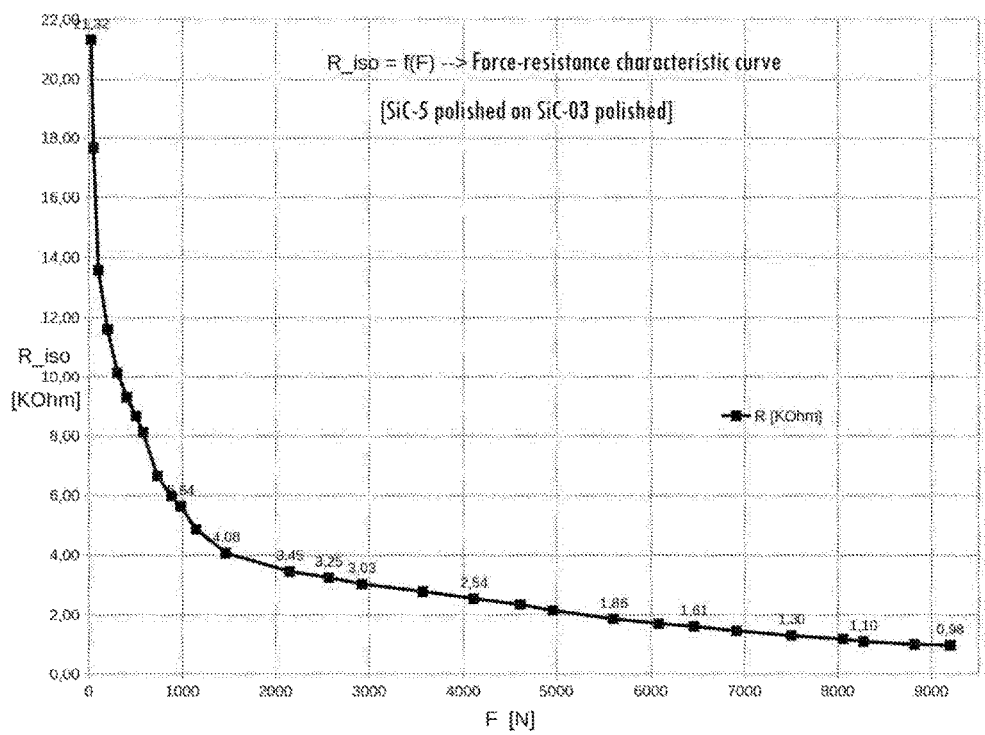
FIG. 12 shows a force-resistance characteristic curve of the thin insulating film measuring cell, comprising two coated hard metal electrodes having different roughness levels [SiC_05 polished on SiC_03 unpolished].

The further exemplary embodiment according to FIG. 5 shows a multi-dimensional sensor design by way of example, wherein electrical force measurement takes place in a component-based manner in the two times four dimensional space from 4 different rotation angles in the 3D space ($F\_x+F\_y$). This electrical measuring circuit and the selected sensor design are shown in the form of a sectional illustration, wherein an arbitrary number of rotationally added (n−) sensor elements can be assembled; however, in the specific example here, n=4 separate units are determined for 4 rotation angles and are intended to show the freedom of design with respect to the mechanical design and electronic evaluation options by way of example.

DESCRIPTION OF LEGEND (1) electrode or shared electrode in the case of multidimensional measuring cells
(2) thin insulating film (**2-*n* or 2.*n*** in the case of a multidimensional design), which is to say nth thin insulating film
(3) electrode or nth electrode in the case of multidimensional sensors (**3-*n* or 3.*n*** in the case of a multidimensional design)
(4) reference metal electrode or nth electrode in the case of multidimensional sensors (**4-*n* or 4.*n*** in the case of a multidimensional design)
(5) mounting for reference metal electrode, which with a constant retaining force fixes the reference metal electrode at a constant retaining force from the two opposite directions
(6) power source $I\_q$
(7) ammeter I or, in the case of a multidimensional design, nth ammeter of the respective force component (direction) and the associated nth current measuring channel
(8) voltmeter U or $U\_n$ or, in the case of a multidimensional design, nth voltmeter of the respective force component (direction) and the associated nth voltage measuring channel (**8-*n* or 8.*n*** in the case of a multidimensional design)
(9) reference voltmeter $U\_ref$ or $U\_ref\text{-}m$ or, in the case of a multidimensional design, mth voltmeter of the respective force component (direction) and the associated mth reference voltage measuring channel (**9-*m* or 9.*m*** in the case of a multidimensional design)
(9) reference ammeter $I\_ref$ or $I\_ref\text{-}m$ or, in the case of a multidimensional design, mth reference ammeter of the respective force component (direction) and the associated mth reference current measuring channel (**9-*m* or 9.*m*** in the case of a multidimensional design)
(11) fixed resistance $R\_1$=constant of the half measuring bridge
(12) fixed resistance $R\_2$=constant of the half measuring bridge
(13) insulating film resistance $R\_1$ of the full measuring bridge
(14) insulating reference resistance $R\_ref\text{-}1$ of the full measuring bridge
(15) insulating resistance $R\_2$ of the full measuring bridge
(16) insulating reference resistance $R\_ref\text{-}2$ of the full measuring bridge

(17) insulating film resistance R_17 between the two measuring cells placed on top of one another to make the full measuring bridge possible [R_>=500*R_1]

The invention claimed is:

1. A device for electrically measuring a force (F) comprising:
a load cell comprising:
a first metal electrode and a second metal electrode disposed opposite thereof in the direction of the force (F) to be measured, each being made of hard metal, steel or low-resistance metal layers on ceramic, glass or plastic bodies and having contact surfaces by way of which the force (F) to be measured can be impressed, and having electrical resistance in the range of a few milliohms to less than or equal to ten ohms and a mean roughness value ($R_a$) of less than or equal to 400 nanometers, for forming force-independent conductivity,
a thin insulating film, disposed between the first metal electrode and the second metal electrode in a form-locked manner and made of a material selected from the group consisting of:
zinc oxide,
stochastically reduced aluminum oxide $Al_2O_x$ where x=2.4 to 2.8,
silicon carbide, or
a DLC layer (diamond-like carbon),
a reference metal electrode, disposed on a section of the thin insulating film in a manner that is force-decoupled from the first metal electrode and tensioned with respect to the second metal electrode at a constant retaining force by a fastening element; and
a measuring circuit designed as a half bridge or a full bridge, wherein
a current path fed from a power source in a series connection runs across the first metal electrode, the thin insulating layer to the second metal electrode, and onward across the thin insulating layer to the reference metal electrode,
a force-dependent voltage is tapped between the first metal electrode and the second metal electrode, the voltage dropping across the thin insulating film,
a reference voltage is tapped between the second metal electrode and the reference metal electrode, and wherein
the measuring circuit forms a voltage ratio from the force-dependent voltage and the reference voltage, the voltage ratio representing a value of the impressed force.

2. The device according to claim 1, wherein the thin insulating film is designed as a thin multi-layer insulating film.

3. The device according to claim 1, wherein the contact surfaces of the first and second metal electrodes have a form fit in the range of less than 4 micrometers across the entire contact surface.

4. The device according to claim 1, wherein the first metal electrode, the second metal electrode and the reference metal electrode have at least the same strength as, or greater strength than, the thin insulating film.

5. The device according to claim 1, wherein a spatial distance of less than or equal to 200 millimeters exists between the measuring circuit and the load cell.

6. The device according to claim 1, wherein the mean roughness value $R_a$ of the contact surfaces of the first metal electrode and of the reference metal electrode are rougher at a ratio of 30:1 to 2:1 compared to the mean roughness value of the contact surface of the second metal electrode, which has a mean roughness value $R_a$ of less than or equal to 200 nanometers.

7. The device according to claim 1, wherein multiple reference metal electrodes are provided on the load cell.

8. The device according to claim 1, further comprising a second load cell having the same design, which can be positioned in the direction of an interfering force component.

9. The device according to claim 1, wherein the load cell further comprises a plurality of thin insulating films, which electrically are associated with a plurality of measuring circuits, and the spatial or geometry arrangement is designed in such a way that the magnitude and direction of the forces to be measured are simultaneously detected as a vector quantity.

10. The device according to claim 1, wherein the first metal electrode, the second metal electrode and the reference metal electrode are manufactured as insertable bodies having freely selectable ruled geometries as positive and negative shapes.

11. The device according to claim 10, wherein the insertable bodies are selected from the following group:
designed as an inside truncated cone and an outside truncated cone comprising lateral surfaces having the same shape, the thin insulating film being applied to the lateral surface; designed as cylinder surfaces, inserted into one another, of the outer cylinder and inner cylinder having thin insulating films applied to the cylinder lateral surface, the thin insulating film applied to the end face of the cylinder rings.

12. The device according to claim 1, wherein the thin insulating film is applied to the circumferential surface of two mutually connected truncated cones on the outer surface of the respective inner electrode, which are mounted respect to a precisely fitting casing made of two outer electrodes that are electrically insulated from one another as a negative shape.

13. The device according to claim 1, wherein an electronic signal generator is used as the power source, which in a first operating mode operates as a regulated direct current source or in a second operating mode as an alternating current signal source, and that furthermore the measuring circuit can be set to the respective operating mode.

14. The device according to claim 1, further comprising mechanical transmission elements for passing on the force to the metal electrodes and the reference metal electrode, which are designed as shaped parts made of strong plastic materials or high-strength composite materials.

15. The device according to claim 1, wherein the measuring circuit further comprises band stop filters or band pass filters.

* * * * *